United States Patent
Kawahara et al.

(10) Patent No.: US 10,260,651 B2
(45) Date of Patent: Apr. 16, 2019

(54) BUTTERFLY VALVE FORMED OF A LAMINATED MATERIAL

(71) Applicants: Hitachi-GE Nuclear Energy, Ltd., Hitachi-shi, Ibaraki (JP); Okano Valve Mfg. Co. Ltd., Kitakyushu-shi, Fukuoka (JP)

(72) Inventors: Yoshiharu Kawahara, Hitachi (JP); Yoshihisa Kiyotoki, Hitachi (JP); Takayoshi Nakashima, Hitachi (JP); Keisuke Sakemura, Kitakyushu (JP); Yoshitomo Kanemura, Kitakyushu (JP); Yukio Imoto, Kitakyushu (JP)

(73) Assignees: Hitachi-GE Nuclear Energy, Ltd., Hitachi-shi (JP); Okano Valve Mfg. Co. Ltd., Kitakyushu-shi (JP)

( * ) Notice: Subject to any disclaimer, the term of this patent is extended or adjusted under 35 U.S.C. 154(b) by 0 days.

(21) Appl. No.: 15/539,449

(22) PCT Filed: Dec. 14, 2015

(86) PCT No.: PCT/JP2015/084903
§ 371 (c)(1),
(2) Date: Jun. 23, 2017

(87) PCT Pub. No.: WO2016/104213
PCT Pub. Date: Jun. 30, 2016

(65) Prior Publication Data
US 2017/0370491 A1   Dec. 28, 2017

(30) Foreign Application Priority Data
Dec. 26, 2014   (JP) ................................ 2014-264705

(51) Int. Cl.
*F16K 25/00*   (2006.01)
*G21C 9/00*   (2006.01)
(Continued)

(52) U.S. Cl.
CPC ............. *F16K 25/005* (2013.01); *F16K 1/22* (2013.01); *F16K 1/222* (2013.01); *F16K 1/226* (2013.01);
(Continued)

(58) Field of Classification Search
CPC ........ F16K 25/005; F16K 1/222; F16K 1/226; F16K 1/2261; F16K 1/2263; F16K 1/228;
(Continued)

(56) References Cited

U.S. PATENT DOCUMENTS 2,673,061 A * 3/1954 Broz .................... F16K 1/24
251/163
3,498,583 A * 3/1970 Friedell ................ F16K 1/221
251/162

(Continued)

FOREIGN PATENT DOCUMENTS

CN   2791384 Y   6/2006
EP   0 499 821 A1   8/1992
(Continued)

OTHER PUBLICATIONS

International Search Report (PCT/ISA/210) issued in PCT Application No. PCT/JP2015/084903 dated Mar. 15, 2016 with English translation (5 pages).
(Continued)

*Primary Examiner* — John Bastianelli
(74) *Attorney, Agent, or Firm* — Crowell & Moring LLP (57) ABSTRACT

A butterfly valve includes a valve body-side valve seat section, a valve box-side valve seat section, and a valve movement mechanism. The valve movement mechanism includes a cam groove, a cam projection, and a reverse key. The valve movement mechanism moves the valve body in an extending direction of the flow passage along with rotation of the valve shaft between a blocking position and (Continued)

an open position. One of the valve body-side valve seat section and the valve box-side valve seat section is formed of a laminated material composed of alternatingly stacked plates made of metal and plates made of expanded graphite.

2 Claims, 7 Drawing Sheets

(51) Int. Cl.
*F16K 1/22* (2006.01)
*F16K 1/226* (2006.01)
*F16K 1/24* (2006.01)
*F16K 1/32* (2006.01)
*F16K 31/05* (2006.01)

(52) U.S. Cl.
CPC .................. *F16K 1/24* (2013.01); *F16K 1/32* (2013.01); *F16K 31/05* (2013.01); *G21C 9/00* (2013.01)

(58) Field of Classification Search
CPC ... F16K 31/05; F16K 1/24; F16K 1/22; F16K 1/32; G21C 9/00
USPC ................................. 251/305–308, 162–163
See application file for complete search history.

(56) References Cited

U.S. PATENT DOCUMENTS

| | | | | |
|---|---|---|---|---|
| 3,587,623 | A * | 6/1971 | Wilson | G21C 9/00 376/283 |
| 3,837,616 | A * | 9/1974 | Castriota-Scanderbeg | F16K 1/228 376/277 |
| 4,817,916 | A * | 4/1989 | Rawstron | F16K 1/24 251/162 |
| 4,842,244 | A * | 6/1989 | Panchison, Jr. | F16K 31/1635 251/26 |
| 4,944,489 | A * | 7/1990 | Adams | F16K 1/2266 251/174 |
| 5,028,383 | A * | 7/1991 | Moore | F16K 17/02 251/61.2 |
| 5,330,157 | A * | 7/1994 | Dern | F16K 1/24 251/162 |
| 5,377,954 | A * | 1/1995 | Adams | F16K 1/2266 251/306 |
| 5,540,415 | A * | 7/1996 | Yamamoto | F16K 1/10 251/118 |
| 5,871,203 | A * | 2/1999 | Gasaway | F16K 1/2261 251/305 |
| 7,775,502 | B2 * | 8/2010 | Ohta | F16K 27/067 251/192 |
| 8,286,938 | B2 * | 10/2012 | Helfer | F16K 1/2261 251/306 |
| 2004/0021117 | A1 | 2/2004 | Chapman | |
| 2009/0114869 | A1 | 5/2009 | Higgs | |
| 2010/0181508 | A1 * | 7/2010 | Yamazaki | F16K 17/10 251/30.01 |
| 2013/0056667 | A1 * | 3/2013 | Shu | F16K 47/08 251/305 |
| 2013/0206238 | A1 * | 8/2013 | Gent | F16K 1/2028 251/308 |

FOREIGN PATENT DOCUMENTS

| | | |
|---|---|---|
| FR | 2 773 202 A1 | 7/1999 |
| JP | 58-96163 U | 6/1983 |
| JP | 8-75013 A | 3/1996 |
| JP | 10-238637 | 9/1998 |
| JP | 2001-50401 A | 2/2001 |
| WO | WO 2007/110664 A1 | 10/2007 |

OTHER PUBLICATIONS

Japanese-language Written Opinion (PCT/ISA/237) issued in PCT Application No. PCT/JP2015/084903 dated Mar. 15, 2016 (3 pages).
Extended European Search Report issued in counterpart European Application No. 15872782.6 dated Jul. 3, 2018 (eight (8) pages).
Cover page of EP 2 059 697 dated May 20, 2009 (one (1) page).

* cited by examiner

BUTTERFLY VALVE FORMED OF A LAMINATED MATERIAL

TECHNICAL FIELD

The present invention relates to a butterfly valve that opens and closes a flow passage of fluid.

BACKGROUND ART

In various plants including a nuclear power plant, a pipe is installed to allow fluid, for example, gas such as air, nitrogen, or vapor, or liquid such as water to flow therethrough. The pipe is sometimes provided with a valve device that opens and closes a flow passage of the fluid to adjust the flow rate of the fluid flowing through the flow passage. As the valve device, a butterfly valve is known which includes a valve box having a flow passage through which fluid flows, a plate-shaped valve body that opens and closes the flow passage, and a rotatable valve shaft that engages with the valve body to pivot the valve body.

As the above-described butterfly valve, a so-called non-sliding butterfly valve is known which is configured so that an outer peripheral portion of a valve body and a valve box do not slide when the valve body pivots.

For example, PTL 1 describes a butterfly valve including a motion converting mechanism that converts the rotary motion of a rotation shaft serving as a valve shaft into a nearly linear motion of a valve body in response to the rotation of the rotation shaft at a predetermined angle position in order to separate the valve body engaged with a valve seat surface of a valve box from the valve seat surface and to engage the valve body separated from the valve seat surface of the valve box with the valve seat surface of the valve box.

CITATION LIST

Patent Literature

PTL 1: Japanese Unexamined Patent Application Publication No. 2001-50401

SUMMARY OF INVENTION

Technical Problem

However, in the butterfly valve described in PTL 1, a valve seat surface of the valve body provided in an outer peripheral portion of the valve body to engage with the valve seat surface of the valve box is made of metal. For this reason, even if the valve seat surface of the valve box and the valve seat surface of the valve body are engaged to block the flow of fluid, when the fluid has high temperature, distortion occurs and a gap is formed between the valve seat surfaces. This may lower sealing performance of the butterfly valve.

Here, it is conceivable to make the valve seat surface of the valve body of a rubber material to enhance sealing performance of the butterfly valve. However, when the valve body is exposed to high-temperature fluid and is installed in a high radiation environment, the valve seat surface of the valve body made of the rubber material deteriorates and deforms, and this may lower sealing performance.

The present invention has been made in view of the above-described problems of the conventional art, and an object of the invention is to provide a butterfly valve that can ensure sufficient sealing performance even when exposed to high-temperature fluid and installed in a high radiation environment.

Solution to Problem

To achieve the above object, a butterfly valve according to the present invention has a valve box having a flow passage, a plate-shaped valve body that opens and closes the flow passage, and a rotatable valve shaft that engages with the valve body to pivot the valve body, and includes a valve body-side valve seat section, a valve box-side valve seat section, and a valve movement mechanism. The valve body-side valve seat section is provided in an outer peripheral portion of the valve body. The valve box-side valve seat section is provided in the valve box. The valve movement mechanism moves the valve body in an extending direction of the flow passage along with rotation of the valve shaft between a blocking position at which the valve body-side valve seat section and the valve box-side valve seat section are in contact with each other to close the flow passage and an open position at which the valve body-side valve seat section and the valve box-side valve seat section are separated from each other to open the flow passage. One of the valve body-side valve seat section and the valve box-side valve seat section is formed of a laminated material composed of a plate made of metal and a plate made of expanded graphite.

Advantageous Effects of Invention

According to the present invention, sealing performance of the butterfly valve can be ensured even when the butterfly valve is exposed to high-temperature fluid and is installed in a high radiation environment.

DESCRIPTION OF EMBODIMENTS

A butterfly valve 10 according to an embodiment of the present invention will be described with reference to FIGS. 1 to 6. Members common to the figures are denoted by the same reference numerals.

<Outline of Nuclear Power Plant Equipped with Butterfly Valve>

Figure 1:
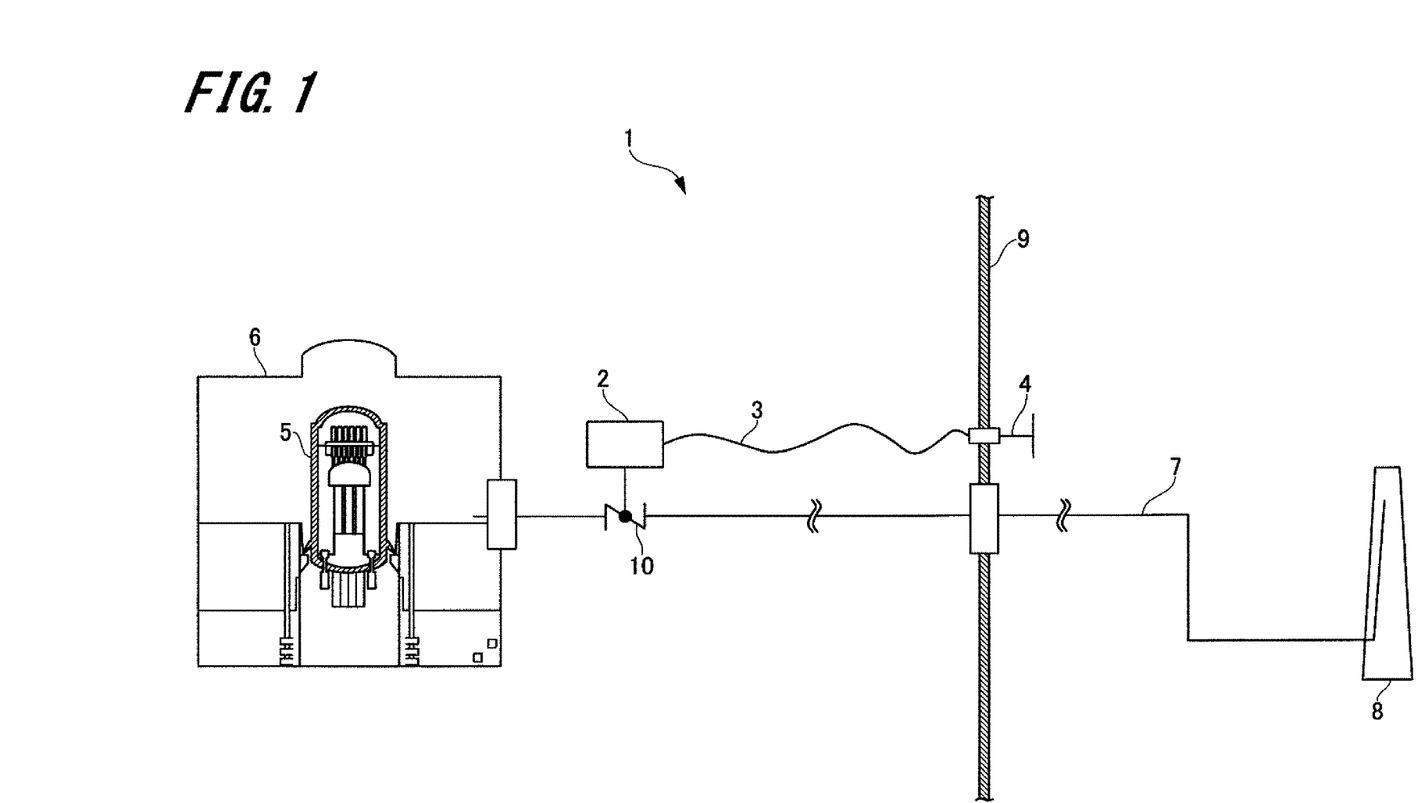
FIG. 1 is a schematic view of a nuclear power plant equipped with a butterfly valve according to an embodiment of the present invention.

First, an outline of a nuclear power plant 1 serving as an example of a plant equipped with a butterfly valve 10 of the embodiment will be described with reference to FIG. 1. FIG. 1 is a schematic view of the nuclear power plant 1 equipped with the butterfly valve 10 of the embodiment.

The nuclear power plant 1 includes a reactor containment vessel 6 disposed inside a reactor building 9, a standby gas treatment facility 8 disposed outside the reactor building 9, and a pipe 7 that connects the reactor containment vessel 6 and the standby gas treatment facility 8. Instead of the standby gas treatment facility 8, a filtered vent facility may be connected to the reactor containment vessel 6 through the pipe 7.

The reactor containment vessel 6 includes a reactor pressure vessel 5. Fluid inside the reactor containment vessel 6, for example, gas such as air, nitrogen, or vapor flows into the standby gas treatment facility 8 through the pipe 7. The fluid that has flowed into the standby gas treatment facility 8 is subjected to various processes for attenuating radiation, and is then discharged into the atmosphere.

The pipe 7 is provided with a butterfly valve 10. The butterfly valve 10 is disposed inside the reactor building 9. When there is a need to reduce the pressure inside the reactor containment vessel 6, for example, in case of a severe accident, the butterfly valve 10 operates to adjust the flow rate of the fluid flowing through the pipe 7 by opening and closing a flow passage of the fluid. Here, the term "severe accident" refers to a state deviating from a design basis accident state to be considered in equipment design of the nuclear power plant. This is a state in which the temperature (of the fluid) inside the reactor containment vessel and the cumulative radiation dose inside the reactor building exceed the design basis values (for example, a state in which the temperature of the fluid exceeds 300° C. and the cumulative radiation dose exceeds 1 MGy is continued).

To the butterfly valve 10, a driving unit 2 is connected to drive a valve body 12 to be described later. The driving unit 2 includes a decelerator (not illustrated) and a motor (not illustrated) for giving operating force to the decelerator. When the operating force is given to the decelerator by driving of the motor, the valve body 12 of the butterfly valve 10 is driven.

To the decelerator in the driving unit 2, a remote manual operation unit 4 is connected through a remote manual operation connecting unit 3. The remote manual operation unit 4 is disposed outside the reactor building 9. The remote manual operation connecting unit 3 is composed of, for example, a clutch and a flexible shaft, and transmits the operating force input to the remote manual operation unit 4 to the decelerator in the driving unit 2. Therefore, when the worker inputs operating force to the remote manual operation unit 4, the input operating force is transmitted to the decelerator in the driving unit 2 through the remote manual operation connecting unit 3, whereby the valve body 12 of the butterfly valve 10 is driven.

<Butterfly Valve>

Figure 2:
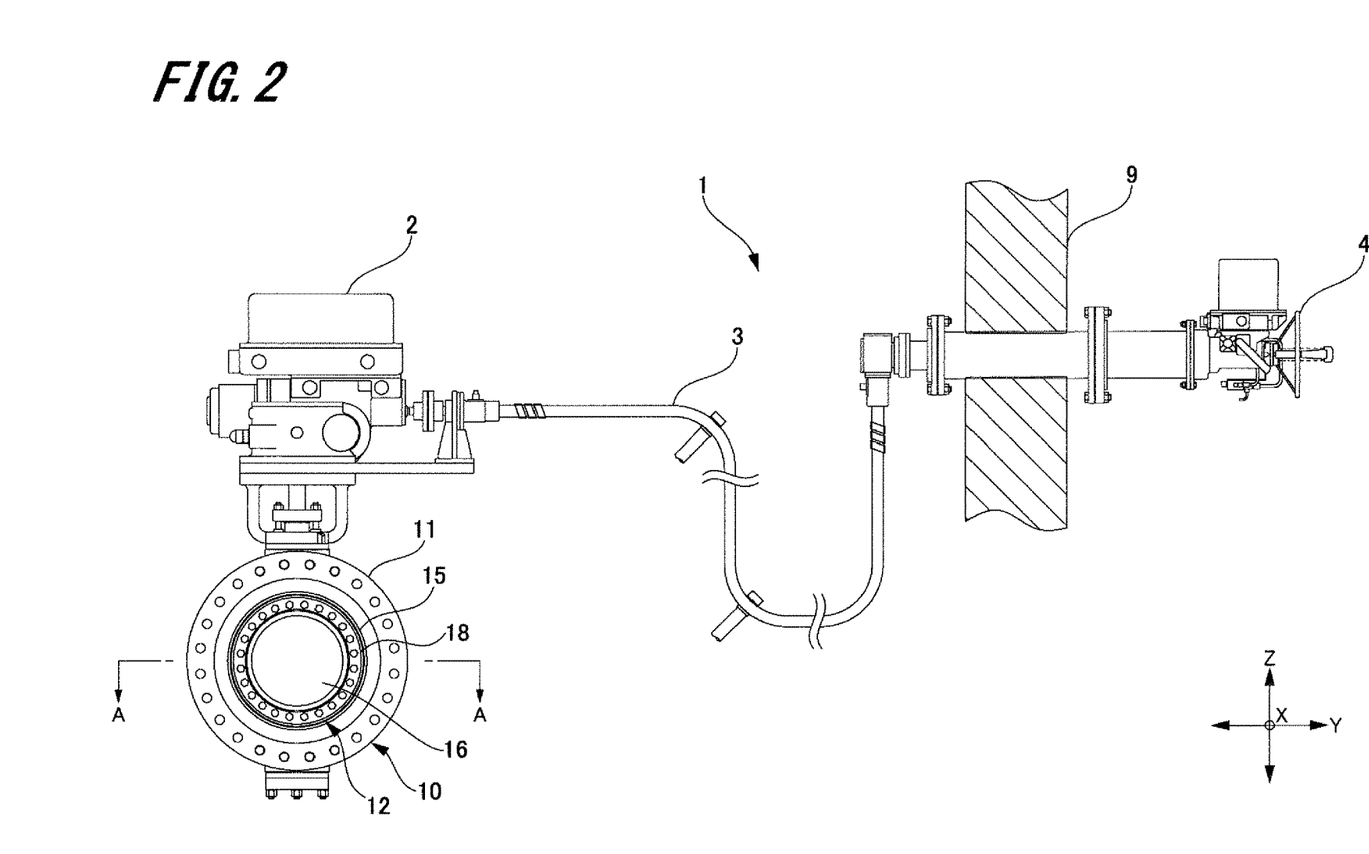
FIG. 2 illustrates the butterfly valve according to the embodiment of the present invention.
Figure 3:
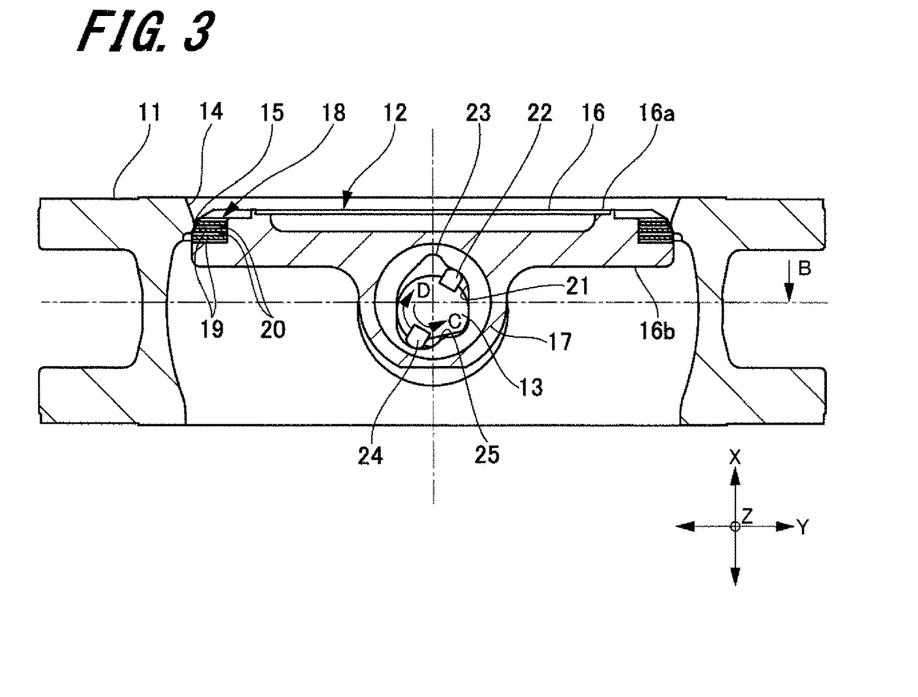
FIG. 3 is a cross-sectional view taken along line A-A of FIG. 2.

Next, a detailed structure of the butterfly valve 10 will be described with reference to FIGS. 2 and 3. FIG. 2 illustrates the butterfly valve 10 according to the embodiment of the present invention. FIG. 3 is a cross-sectional view taken along line A-A of FIG. 2.

As illustrated in FIGS. 2 and 3, the butterfly valve 10 includes a valve box 11, a valve body 12, and a valve shaft 13.

The valve box 11 is a substantially cylindrical member made of metal, and a flow passage 14 through which fluid flows is provided therein. The valve box 11 has almost the same diameter as that of the pipe 7. The flow passage 14 communicates with a flow passage in the pipe 7 (not illustrated). In the following description, an extending direction of the flow passage 14 is referred to as an X-direction, a direction orthogonal to the X-direction in the horizontal plane is referred to as a Y-direction, and a direction orthogonal to the X-direction and the Y-direction is referred to as a Z-direction.

As illustrated in FIG. 3, on an inner peripheral surface of the valve box 11, a substantially annular valve box-side valve seat section 15 made of metal projects toward the axis of the valve box 11. The valve box-side valve seat section 15 is disposed in one end portion of the valve box 11 in the X-direction. Also, the valve box-side valve seat section 15 is provided in such a manner that its inner diameter increases from the one end portion toward the other end portion in the X-direction.

The valve box 11 further has a valve body stopper (not illustrated) for restricting the pivot range of the valve body 12 and restricting the rotation range of the valve shaft 13.

The valve body 12 blocks or opens the flow passage 14 in the valve box 11, that is, opens or closes the flow passage 14 to adjust the flow rate of the fluid flowing through the pipe 7. The valve body 12 includes a valve-body main part 16 and a boss part 17. The valve body 12 is biased by an unillustrated biasing member in one direction of the X-direction shown by arrow B in FIG. 3 (hereinafter sometimes referred to as "B-direction"). In the embodiment, the flowing direction of the fluid is a direction opposite from the direction of arrow B.

The valve-body main part 16 is substantially disc-shaped. The valve-body main part 16 has one flat surface 16a and the other flat surface 16b orthogonal to the X-direction when the valve-body main part 16 is located in a position to block the flow passage 14 (hereinafter sometimes referred to as "blocking position").

In an outer peripheral portion of the valve-body main part 16, a valve body-side valve seat section 18 is provided in a substantially annular shape. As illustrated in FIG. 3, the valve body-side valve seat section 18 is provided in such a manner that its outer diameter increases from one end portion toward the other end portion in the X-direction. The outer diameter of the valve body-side valve seat section 18 is set so that the valve body-side valve seat section 18 is in contact with the valve box-side valve seat section 15 without any gap therebetween.

The valve body-side valve seat section 18 is formed by a laminated structure in which plate-shaped bodies 19 made of expanded graphite and stainless steel plates 20 are stacked. The valve body-side valve seat section 18 in the embodiment is formed by alternately stacking a plurality of prepared plate-shaped bodies 19 made of expanded graphite and a plurality of prepared stainless steel plates 20 in a die and pressure-bonding these plates. The method for forming the valve body-side valve seat section 18 is not limited to this. For example, the pressure-bonding step may be omitted, and the plate-shaped bodies 19 and 20 may be simply bonded with adhesive.

The boss part 17 is a substantially cylindrical member extending in the Z-direction, and is provided on the other flat surface 16b of the valve-body main part 16. The boss part 17 has a shaft hole 21 in which the valve shaft 13 is inserted. An inner peripheral surface of the boss part 17 has a cam groove 23 recessed outward to engage with a forward key 22 of the valve shaft 13 to be described later. At a position nearly opposed to the cam groove 23 on the inner peripheral surface of the boss part 17, a cam projection 25 projects inward to engage with a reverse key 24 of the valve shaft 13 to be described later.

The valve shaft 13 is a rod-shaped member extending in the Z-direction and rotatably supported in the valve box 11. The valve shaft 13 is connected to the decelerator in the driving unit 2. The valve shaft 13 is rotated by operating force given from the motor to the decelerator in the driving unit 2 and operating force input to the remote manual operation unit 4 and transmitted to the decelerator in the driving unit 2. The valve shaft 13 rotates in a direction of arrow C in FIG. 3 (hereinafter sometimes referred to as "C-direction") and a direction of arrow D in FIG. 3 (hereinafter sometimes referred to as "D-direction") which is opposite from the C-direction. The rotation range of the valve shaft 13 is limited to the range of 120 to 90 degrees or more and the pivot range of the valve body 12 is limited to about 90 degrees by the above-described valve body stopper.

On an outer peripheral surface of the valve shaft 13, a forward key 22 and a reverse key 24 are provided along the Z-direction to project outward from the axis. Also, the forward key 22 and the reverse key 24 are substantially axis-symmetrical with respect to the axis. When the valve shaft 13 is inserted in the shaft hole 21 of the boss part 17, it engages with the valve body 12, and the valve body 12 is supported by the valve box 11 with the valve shaft 13 interposed therebetween.

<Motion of Butterfly Valve>

Figure 4:
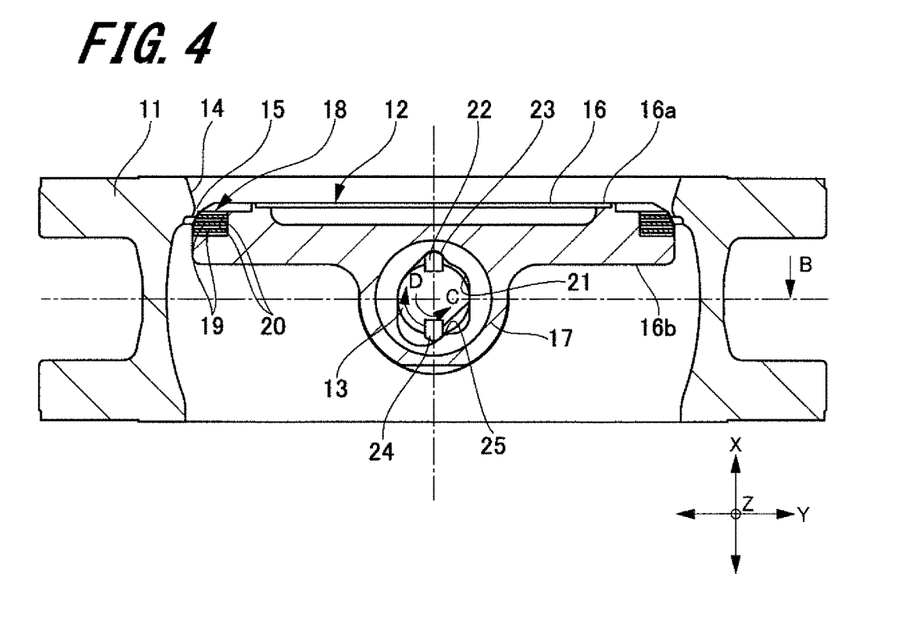
FIG. 4 explains the motion of the butterfly valve according to the embodiment of the present invention, and illustrates a state in which a valve body is in an open position.
Figure 5:
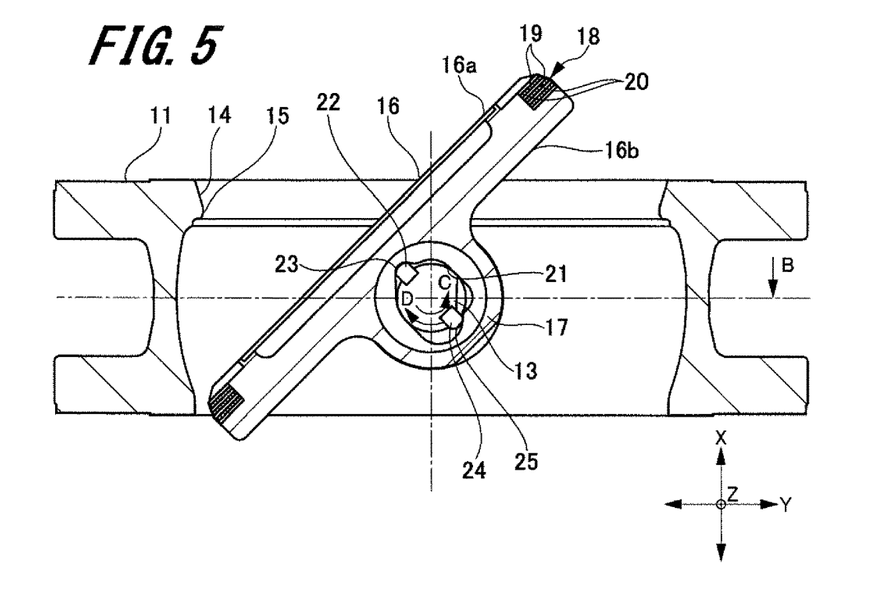
FIG. 5 explains the motion of the butterfly valve according to the embodiment of the present invention, and illustrates a state in which the valve body is pivoting.
Figure 6:
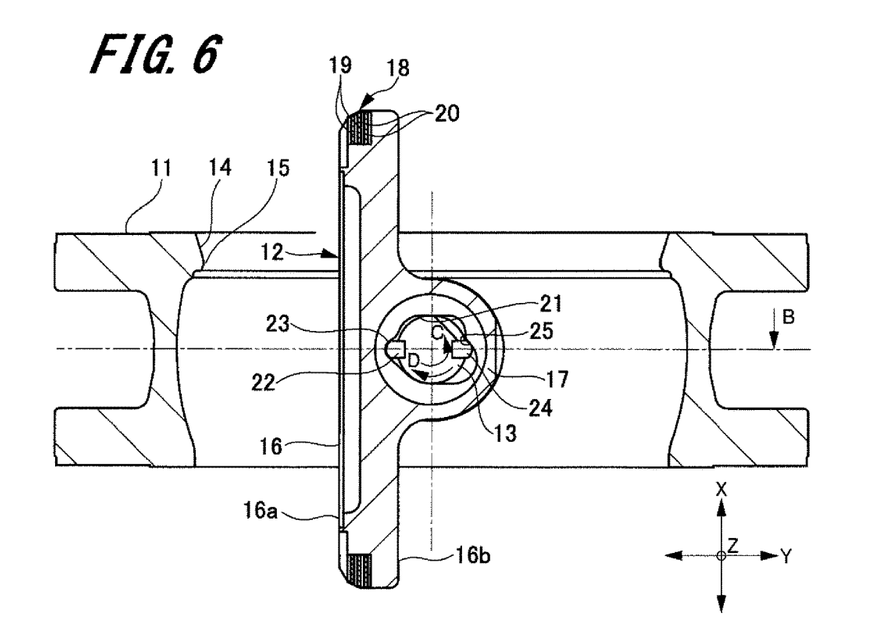
FIG. 6 explains the motion of the butterfly valve according to the embodiment of the present invention, and illustrates a state in which the valve body is in a maximum open position.

Next, the motion of the butterfly valve 10 of the embodiment will be described with reference to FIGS. 3 to 6. FIGS. 4 to 6 explain the motion of the butterfly valve 10 of the embodiment. FIG. 4 illustrates a state in which the valve body 12 is in an open position. FIG. 5 illustrates a state in which the valve body 12 is pivoting. FIG. 6 illustrates a state in which the valve body 12 is in a maximum open position. FIGS. 4 to 6 are cross-sectional views of the butterfly valve 10 taken at the center of the valve body 12 and along a plane horizontal to the X-direction and the Y-direction.

First, a description will be given of the motion of the butterfly valve 10 when the flow passage 14 is opened by driving the valve body 12 that blocks the flow passage 14.

As illustrated in FIG. 3, when the valve body-side valve seat section 18 and the valve box-side valve seat section 15 are in contact with each other and the flow passage 14 is blocked, that is, when the valve body 12 is in the blocking position, the inner peripheral surface of the boss part 17 is in contact with the forward key 22 of the valve shaft 13. For this reason, movement of the valve body 12 in the B-direction by the biasing force from the biasing member is restricted.

When the valve shaft 13 rotates in the C-direction from the state of FIG. 3, the forward key 22 is opposed to the cam groove 23 of the boss part 17 in the X-direction, and the valve body 12 is moved in the B-direction by the biasing force from the biasing member. Then, as illustrated in FIG. 4, the forward key 22 and the cam groove 23 engage with each other. Also, the reverse key 24 and the cam projection 25 engage with each other. In the following description, the position of the valve body 12 at this time is sometimes referred to as "open position." When the valve body 12 moves from the blocking position (see FIG. 3) to the open position, a gap is formed between the valve body-side valve seat section 18 and the valve box-side valve seat section 15, and the blocked flow passage 14 is opened.

When the valve shaft 13 rotates in the C-direction from the state of FIG. 4, the valve body 12 pivots in the C-direction along with the rotation of the valve shaft 13 because the reverse key 24 and the cam projection 25 are engaged with each other. Then, when the valve body 12 pivots in the C-direction from the open position (see FIG. 4), as illustrated in FIG. 5, the distance between the valve body-side valve seat section 18 and the valve box-side valve seat section 15 further increases, and the open amount of the flow passage 14 becomes larger than in the state of FIG. 4. This open position is set so that the valve body-side valve seat section 18 and the valve box-side valve seat section 15 are not in contact with each other when the valve body 12 pivots from the open position and when the valve body 12 pivots to the open position, as will be described later.

When the valve shaft 13 rotates in the C-direction from the state of FIG. 5 and further rotates to a position where its rotation is restricted by the unillustrated valve body stopper, as illustrated in FIG. 6, the valve body 12 pivots to a position turned about 90 degrees from the open position (see FIG. 4). The position of the valve body 12 at this time is sometimes referred to as "maximum open position." When the valve body 12 is in the maximum open position, the open amount of the flow passage 14 becomes the largest.

Next, a description will be given of the motion of the butterfly valve 10 when the opened flow passage 14 is blocked by driving the valve body 12 in the maximum open position (see FIG. 6).

When the valve shaft 13 rotates in the D-direction from the state of FIG. 6, the valve body 12 pivots in the D-direction along the rotation of the valve shaft 13 because the forward key 22 and the cam groove 23 are engaged with each other. Then, when the valve body 12 pivots in the D-direction from the maximum open position (see FIG. 6), the open amount of the flow passage 14 becomes smaller than in the state of FIG. 6, as illustrated in FIG. 5.

When the valve shaft 13 rotates in the D-direction from the state of FIG. 5 and the valve body 12 reaches the open position (see FIG. 4) along with the rotation of the valve shaft 13, the pivot of the valve body 12 is restricted by the above-described valve body stopper.

When the valve shaft 13 rotates in the D-direction from the state of FIG. 4, the cam groove 23 and the forward key 22 are disengaged, as illustrated in FIG. 3, because the pivot of the valve body 12 is restricted. Then, the forward key 22 slides on the inner peripheral surface of the boss part 17. Thus, the valve body 12 moves in the direction opposite from the B-direction against the biasing force of the biasing member. Then, as illustrated in FIG. 3, the valve body 12 moves to the blocking position, that is, the valve body-side valve seat section 18 and the valve box-side valve seat section 15 are brought into contact with each other, and this blocks the flow passage 14.

As described above, the forward key 22 and the reverse key 24 of the valve shaft 13, the cam groove 23 and the cam projection 25 of the boss part 17, and the biasing member for biasing the valve body 12 in the B-direction (see FIG. 3) constitute a cam structure, and also constitute a valve movement mechanism that moves the valve body 12 in the extending direction of the flow passage 14 between the open position where the valve body-side valve seat section 18 and the valve box-side valve seat section 15 are separated and the blocking position as the valve shaft 13 rotates. As this valve movement mechanism, other known techniques, for example, the technique described in Japanese Unexamined Patent Application Publication No. 2001-50401 may be adopted.

<Operation>

In the butterfly valve 10 of the embodiment, the valve body-side valve seat section 18 is formed by the laminated structure in which the plate-shaped bodies 19 made of expanded graphite and the stainless steel plates 20 are stacked. The valve box-side valve seat section 15 is made of metal. For this reason, since both the valve body-side valve seat section 18 and the valve box-side valve seat section 15 are highly resistant to high temperature and a high radiation environment, they do not deteriorate and deform even when exposed to high-temperature fluid and installed in the high-radiation environment. Moreover, the valve body-side valve seat section 18 and the valve box-side valve seat section 15 can be made in tighter contact with each other than when the valve body-side valve seat section is made of metal. For this reason, high sealing performance can be obtained.

Therefore, even when the butterfly valve 10 is exposed to the high-temperature fluid and is installed in the high-radiation environment, sufficient sealing performance of the butterfly valve 10 can be ensured (first operation).

The butterfly valve 10 includes the valve movement mechanism that moves the valve body 12 between the open position and the blocking position, and is a so-called non-sliding butterfly valve in which the valve body-side valve seat section 18 and the valve box-side valve seat section 15 are not in contact with each other when the valve body 12 pivots from the open position and when the valve body 12 pivots to the open position. Therefore, it is possible to suppress deterioration of the valve body-side valve seat section 18 and the valve box-side valve seat section 15 caused by the contact therebetween when the valve body 12 pivots. It is known that the valve seat using the plate-shaped bodies 19 made of expanded graphite pronouncedly deteriorates along with pivotal and sliding motion of the valve body 12. By adopting the structure of the embodiment, deterioration of the sealing member can be greatly reduced.

Therefore, sealing performance of the butterfly valve 10 can be ensured for a long period (second operation).

The valve shaft 13 that drives the valve body 12 while engaging with the valve body 12 is connected to the decelerator in the driving unit 2. Also, the valve shaft 13 is rotated by the operating force given from the motor to the decelerator in the driving unit 2 and the operating force input to the remote manual operation unit 4 disposed outside the reactor building 9 and transmitted to the decelerator in the driving unit 2. Therefore, even in a case in which the motor in the driving unit 2 becomes inoperable, for example, in the above-described severe accident and the worker cannot approach the vicinity of the butterfly valve 10, the worker can drive the valve body 12 by inputting the operating force through the operation of the remote manual operation unit 4 disposed outside the reactor building 9.

Therefore, even in case of the severe accident, the butterfly valve 10 can be operated, and the function of the butterfly valve 10 can be ensured (third operation).

It is considered that the valve seat section formed by the laminated structure in which the plate-shaped bodies 19 made of expanded graphite and the stainless steel plates 20 are stacked is more greatly influenced by deterioration with time than the valve seat section made of metal. In the butterfly valve 10 of the embodiment, the valve body-side valve seat section 18 is formed by the laminated structure in which the plate-shaped bodies 19 made of expanded graphite and the stainless steel plates 20 are stacked, and the valve box-side valve seat section 15 is made of metal. To replace the valve body-side valve seat section 18, a complete set of the valve body can be replaced with a new one, or the valve body can be returned to the factory for repair. On the other hand, to replace the valve box-side valve seat section 15, the valve box needs to be returned to the factory, and the valve box-side valve seat section 15 cannot be replaced relatively more easily than the valve body-side valve seat section 18.

Therefore, maintenance operation for ensuring sealing performance of the butterfly valve 10 can be relatively easily performed (fourth operation).

MODIFICATIONS

The present invention is not limited to the above-described embodiment, and various modifications described below are included therein. The above-described embodiment has been explained in detail in order to facilitate easy understanding of the present invention, and the present invention is not necessarily limited to those including all configurations described.

First Modification

Figure 7:
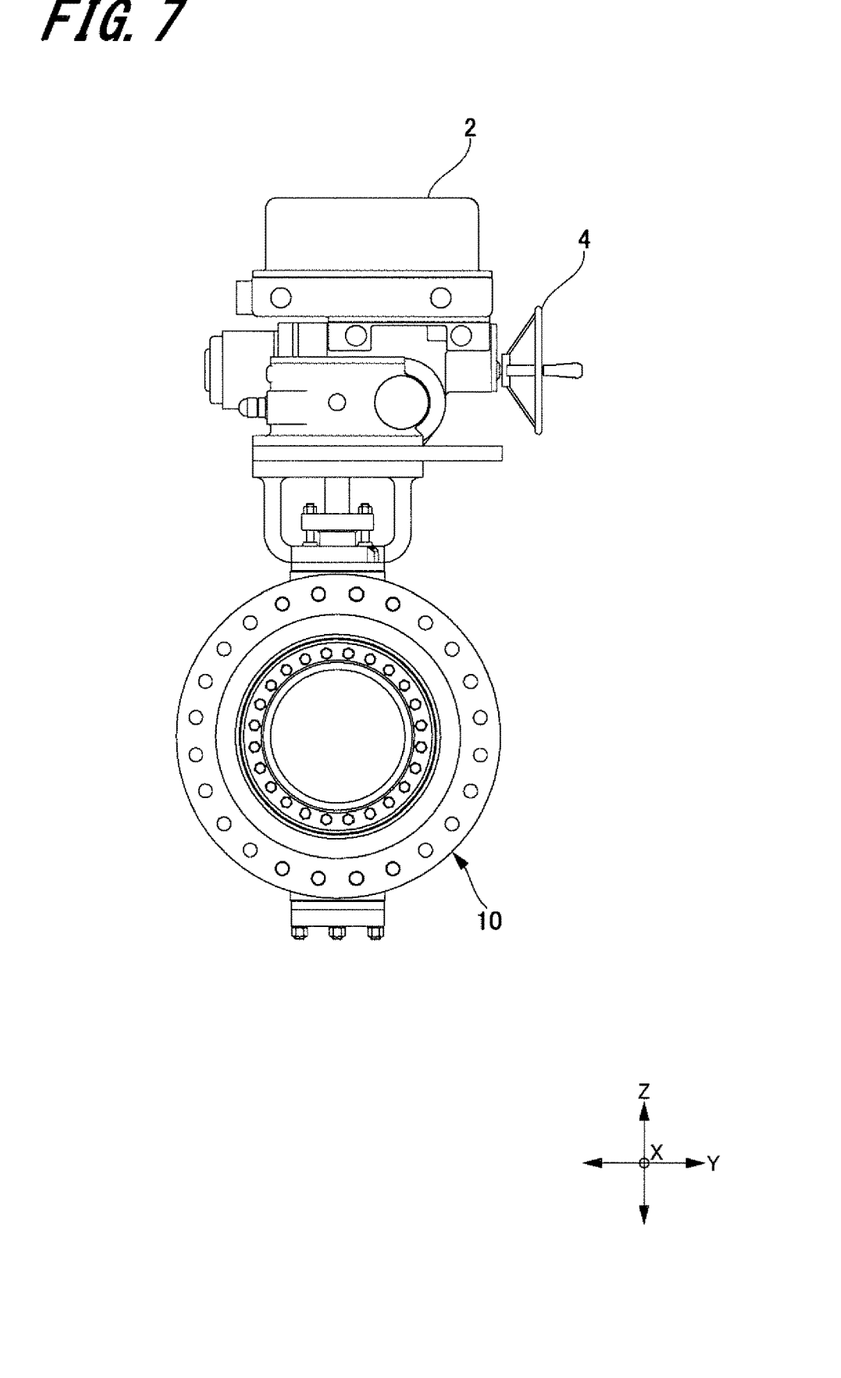
FIG. 7 illustrates a butterfly valve according to a first modification.

In the above-described embodiment, as illustrated in FIG. 2, the remote manual operation unit 4 is connected to the driving unit 2 through the remote manual operation connecting unit 3. However, alternatively, as illustrated in FIG. 7, installation of the remote manual operation connecting unit 3 may be omitted, and the remote manual operation unit 4 may be directly connected to the driving unit 2. In this case, it is also possible to provide the first operation, the second operation, and the fourth operation described above.

Second Modification

Figure 8:
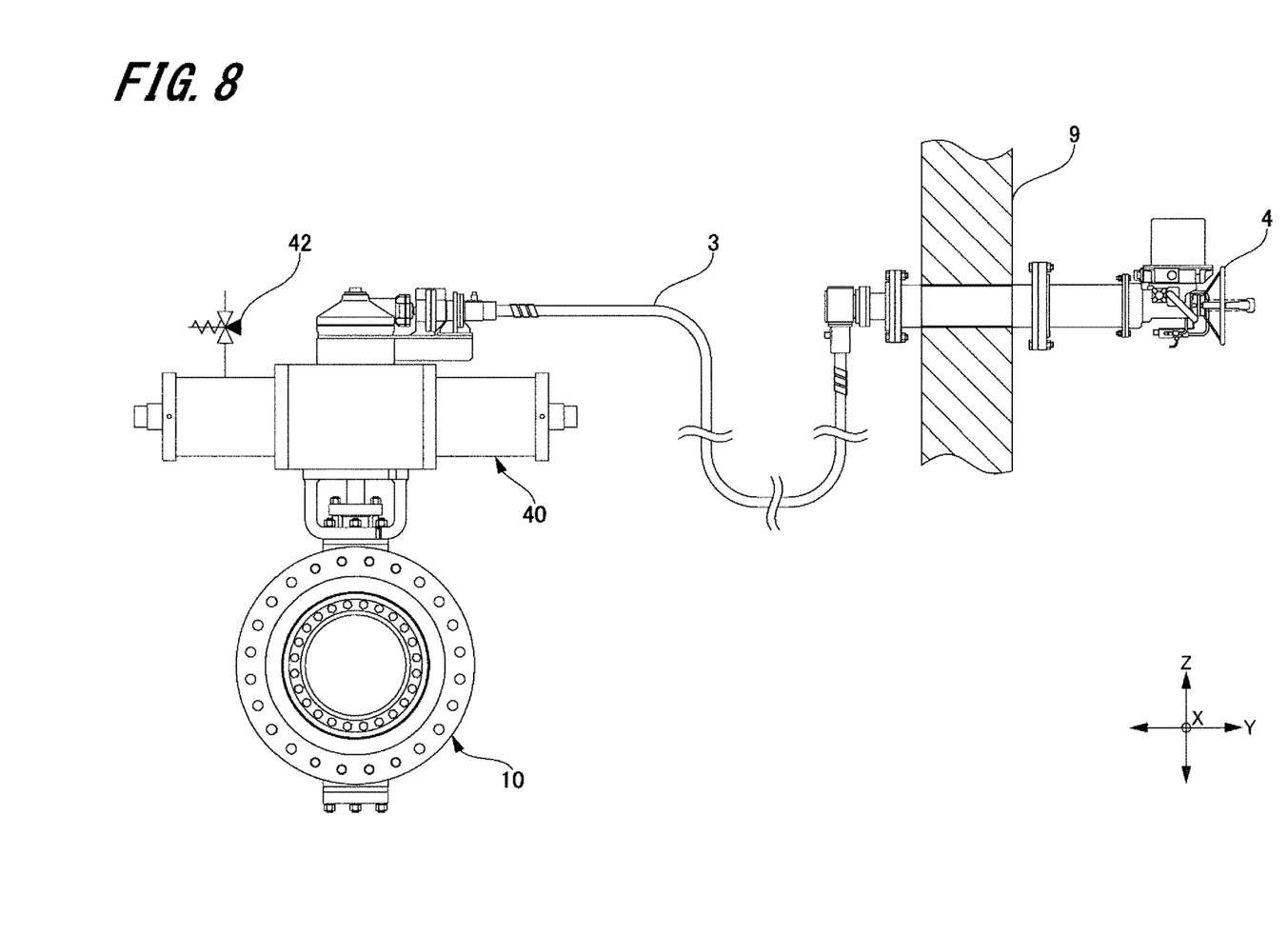
FIG. 8 illustrates a butterfly valve according to a second modification.

Alternatively, as illustrated in FIG. 8, the butterfly valve 10 may be connected to an air-operated driving unit 40 that drives the valve body 12 by adjusting the air pressure. The air-operated driving unit 40 includes a decelerator (not illustrated), a cylinder part 41 connected to the decelerator, a three-way electromagnetic valve 42 connected to the cylinder part 41, and a pump (not illustrated) connected to the three-way electromagnetic valve 42.

The three-way electromagnetic valve 42 connects the pump and the cylinder part 41 and can selectively set a state in which air is introduced into the cylinder part 41, a state in which air in the cylinder part 41 is removed, or a state in which the internal pressure of the cylinder part 41 is maintained.

The cylinder part 41 has a piston (not illustrated) therein. When the three-way electromagnetic valve 42 is set in the state in which air is introduced into the cylinder part 41, air flows into the cylinder part 41, and the internal pressure increases, the piston moves in one direction. By this movement of the piston, operating force is input to the decelerator, and the valve shaft 13 (see FIG. 3) rotates in the C-direction. When the three-way electromagnetic valve 42 is set in the state in which air in the cylinder part 41 is removed, air in the cylinder part 41 is removed, and the internal pressure decreases, the piston moves in the other direction. By this movement of the piston, operating force is input to the decelerator, and the valve shaft 13 (see FIG. 3) rotates in the D-direction. When the three-way electromagnetic valve 42 is set in the state in which the internal pressure in the cylinder part 41 is maintained, the valve shaft 13 (see FIG. 3) does not rotate, but is fixed at the present position.

A remote manual operation unit 4 disposed outside a reactor building 9 is connected to the decelerator in the air-operated driving unit 40 through a remote manual operation connecting unit 3.

In this case, it is also possible to provide the first operation to the fourth operation described above.

Third Modification

Figure 9:
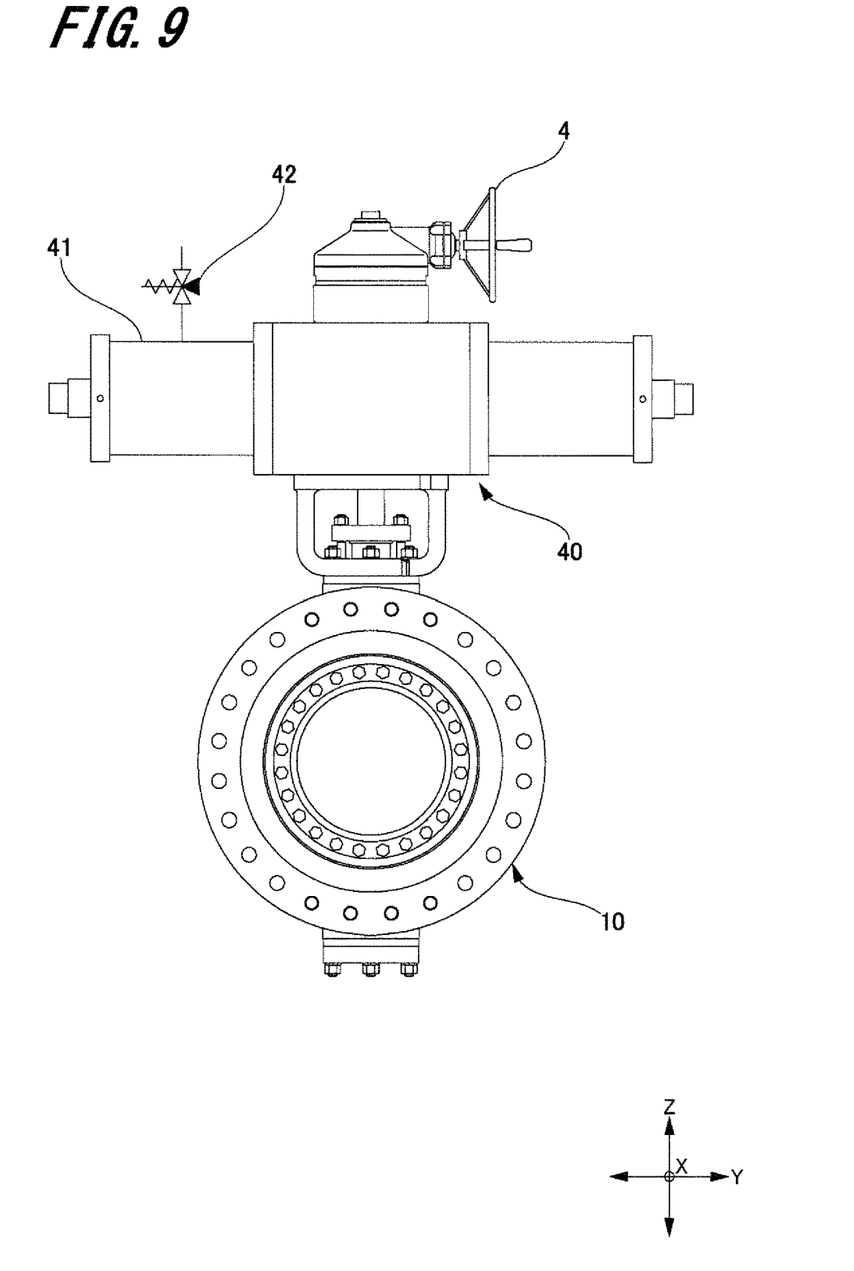
FIG. 9 illustrates a butterfly valve according to a third modification.

As illustrated in FIG. 9, installation of the remote manual operation connecting unit 3 may be omitted, and the remote manual operation unit 4 may be directly connected to the air-operated driving unit 40. In this case, it is also possible to provide the first operation, the second operation, and the fourth operation described above.

Fourth Modification

The valve body-side valve seat section 18 may be replaced with a valve body-side valve seat section made of metal, and the valve box-side valve seat section 15 may be replaced with a valve box-side valve seat section formed by a laminated structure in which plate-shaped bodies made of expanded graphite and stainless steel plates are laminated.

A part of the configuration of a certain modification described above can be replaced by the configuration of another modification, or the configuration of another modification may be added to the configuration of the certain modification. Further, addition, deletion, and replacement can be made between a part of the configuration of each modification and the configuration of another modification.

REFERENCE SIGNS LIST

1 nuclear power plant, 2 driving unit, 3 remote manual operation connecting unit, 4 remote manual operation unit, 5 reactor pressure vessel, 6 reactor containment vessel, 7 pipe, 8 standby gas treatment facility, 9 reactor building, 10 butterfly valve, 11 valve box, 12 valve body, 13 valve shaft, 14 flow passage, 15 valve box-side valve seat section, 16 valve-body main part, 17 boss part, 18 valve body-side valve seat section, 19 plate-shaped body, 20 stainless steel plate, 21 shaft hole, 22 forward key, 23 cam groove, 24 reverse key, 25 cam projection

The invention claimed is:

1. A system comprising:
a reactor containment vessel;
a treatment facility;
a butterfly valve including arranged in a pipe connecting the reactor containment vessel disposed inside a reactor building and the treatment facility disposed outside the reactor building, and being configured to adjust pressure inside the reactor containment vessel, the butterfly valve comprising:
a valve box that forms a flow passage in the pipe;
a plate-shaped valve body that opens and closes the flow passage;
a rotatable valve shaft that is inserted into a boss part provided in the valve body and engages with the valve body via the boss part to cause the valve body to rotate;
a valve body-side valve seat section formed in an outer peripheral portion of the valve body;
a valve box-side valve seat section formed in an inner peripheral portion of the valve box; and
a valve movement mechanism that moves the valve body in an extending direction of the flow passage, along with rotation of the valve shaft, between a blocking position at which the valve body-side valve seat section and the valve box-side valve seat section are caused to be in contact with each other to close the flow passage and an open position at which the valve body-side valve seat section and the valve box-side valve seat section are caused to be separated from each other to open the flow passage, wherein
one of the valve body-side valve seat section and the valve box-side valve seat section is formed of a laminated material composed of plates made of metal and plates made of expanded graphite,
the valve movement mechanism includes two projecting portions that project outward from an axis of the valve shaft and that are formed substantially axis-symmetrical with respect to the axis, and a cam groove and a cam projection that are provided in the boss part and engage with one of the two projecting portions of the valve shaft and the other of the two projecting portions, respectively, at a predetermined rotational position, and
the valve movement mechanism is connected, through a remote manual operation connecting unit, to a remote manual operation unit disposed outside the reactor building, and remotely controlled by the remote manual operation unit.

2. A system comprising:
a reactor containment vessel;
a treatment facility;
a controller for a butterfly valve arranged in a pipe connecting the reactor containment vessel disposed inside a reactor building and the treatment facility disposed outside the reactor building and capable of adjusting pressure inside the reactor containment vessel, the controller comprising:
a pipe connecting a reactor containment vessel disposed inside a reactor building and a treatment facility disposed outside the reactor building;
a butterfly valve arranged in the pipe and capable of adjusting pressure in the reactor containment vessel by controlling a flow passage in the pipe;
a valve body moving mechanism that controls rotation of the butterfly valve between a blocking position and an open position of the flow passage in the pipe; and
a remote manual operation unit arranged outside the reactor building, and connected to the valve body moving mechanism via a remote manual operation connecting unit, wherein
the butterfly valve includes,
a valve box that forms a flow passage in the pipe,
a plate-shaped valve body that opens and closes the flow passage,
a rotatable valve shaft that is inserted into a boss part provided in the valve body and engages with the valve body via the boss part to cause the valve body to rotate,
a valve body-side valve seat section formed in an outer peripheral portion of the valve body, and
a valve box-side valve seat section formed in an inner peripheral portion of the valve box,
one of the valve body-side valve seat section and the valve box-side valve seat section is formed of a laminated material composed of plates made of metal and plates made of expanded graphite,
the valve movement mechanism includes two projecting portions that project outward from an axis of the valve shaft and that are formed substantially axis-symmetrical with respect to the axis, and a cam groove and a cam projection that are provided in the boss part and engage with one of the two projecting portions of the valve shaft and the other of the two projecting portions, respectively, at a predetermined rotational position, and the valve movement mechanism is remotely controlled by the remote manual operation unit so as to be movable along an extending direction of the flow passage, with rotation of the valve shaft, between a blocking position to close the flow passage and an open position to open the flow passage.

* * * * *

UNITED STATES PATENT AND TRADEMARK OFFICE
CERTIFICATE OF CORRECTION

PATENT NO. : 10,260,651 B2
APPLICATION NO. : 15/539449
DATED : April 16, 2019
INVENTOR(S) : Yoshiharu Kawahara et al.

Page 1 of 1

It is certified that error appears in the above-identified patent and that said Letters Patent is hereby corrected as shown below:

In the Claims

Please amend Claim 1, at Line 45 as follows:
a butterfly valve arranged in a pipe connecting Rather than:
a butterfly valve including arranged in a pipe connecting Signed and Sealed this
Twenty-seventh Day of August, 2019

Andrei Iancu
*Director of the United States Patent and Trademark Office*